(12) United States Patent
Matsumoto et al.

(10) Patent No.: US 7,294,076 B2
(45) Date of Patent: *Nov. 13, 2007

(54) TRANSMISSION APPARATUS FOR BICYCLE

(75) Inventors: Shinya Matsumoto, Saitama (JP);
Yoshiaki Tsukada, Saitama (JP);
Takeshi Hashimoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 643 days.

This patent is subject to a terminal disclaimer.

(21) Appl. No.: 10/807,387

(22) Filed: Mar. 24, 2004

(65) Prior Publication Data

US 2004/0214670 A1   Oct. 28, 2004

(30) Foreign Application Priority Data

Mar. 26, 2003   (JP) ............................. 2003-086359

(51) Int. Cl.
*B62M 9/06* (2006.01)
*B62M 9/12* (2006.01)
*F16H 63/02* (2006.01)

(52) U.S. Cl. ........................... 474/78; 474/80; 474/160

(58) Field of Classification Search ............ 474/78–82, 474/73, 148, 70; 280/259–261, 283–286, 280/236–238
See application file for complete search history.

(56) References Cited

U.S. PATENT DOCUMENTS

| | | | |
|---|---|---|---|
| 3,948,542 A * | 4/1976 | Lukich | 280/238 |
| 4,771,636 A * | 9/1988 | Fujita | 74/371 |
| 5,099,712 A | 3/1992 | Douglas | |
| 5,292,286 A * | 3/1994 | Lan | 474/78 |
| 5,404,768 A * | 4/1995 | Hwang et al. | 74/371 |
| 5,611,556 A * | 3/1997 | Davidow | 280/236 |
| 5,873,590 A * | 2/1999 | Abe et al. | 280/259 |
| 7,097,190 B2 * | 8/2006 | Matsumoto et al. | 280/283 |

FOREIGN PATENT DOCUMENTS

| | | | |
|---|---|---|---|
| EP | 1 418 120 A | | 5/2004 |
| FR | 2 711 351 A | | 4/1995 |
| JP | 9-89012 A | | 3/1997 |
| KR | 2002-023618 A | * | 3/2002 |
| WO | WO 01/15963 A | | 3/2001 |

* cited by examiner

*Primary Examiner*—Marcus Charles
(74) *Attorney, Agent, or Firm*—Birch, Stewart, Kolasch & Birch, LLP (57) ABSTRACT

A transmission apparatus for a bicycle is capable of performing a transmission operation even while operating or running by the inertia of the bicycle. The transmission apparatus T for a bicycle includes a driving sprocket member rotationally driven by a crankshaft; a multi-stage driven sprocket member drivingly connected to the output shaft cooperatively engaged and rotated with the rear wheel; a chain applied over the driving sprocket member and the driven sprocket member; and a transmission changing-over mechanism M2 for positioning the chain among a plurality of transmission sprockets. The driven sprocket member is integrally arranged to always be rotated, and the one-way clutch for transmitting a rotation of the crankshaft to the driving sprocket member while in its normal rotating direction is arranged in the power transmitting path extending from the crankshaft to the driving sprocket member.

16 Claims, 7 Drawing Sheets

TRANSMISSION APPARATUS FOR BICYCLE

CROSS-REFERENCES TO RELATED APPLICATIONS

This nonprovisional application claims priority under 35 U.S.C. § 119(a) on Patent Application No. 2003-086359 filed in Japan on Mar. 26, 2003, the entirety of which is herein incorporated by reference.

BACKGROUND OF THE INVENTION

1. Field of the Invention

The present invention relates to a transmission apparatus for a bicycle, and more particularly to a transmission applying an endless transmission belt over a driving, rotating member and a multi-stage driven rotating member arranged at an output shaft that is cooperatively engaged with and rotated with a driving wheel of the bicycle.

2. Description of the Background Art

Applicants have determined that the background art suffers from the following disadvantages. Specifically, some bicycles have an output shaft that is always engaged with the driving wheel and provided with a one-way clutch in such a way that the bicycle can run even in the case that a driver stops pedaling, e.g., while operating the bicycle on a down-slope and the crankshaft is not rotated in a normal rotating direction.

In the case of the bicycle described in Patent Document Japanese Patent Laid-Open No. Hei (1997)-89012, a chain is wound around a large gear of a gear crank and a plurality of small gears installed at a rear hub, and a free wheel is installed at the rear hub. The free wheel is provided with an outer cylinder having said small gears connected in a relative unrotatable manner, an inner cylinder arranged inside the outer cylinder in such a way that is may be relatively rotated and connected to a hub member of the rear hub in such a way that it may not be relatively rotated, and a one-way clutch is arranged between the outer cylinder and the inner cylinder.

The one-way clutch transmits a driving power from the gear crank transmitted to the small gears only in one rotational direction from the outer cylinder to the inner cylinder. Therefore, when the pedals are driven in a forward direction, the driving power is transmitted to the outer cylinder of the free wheel through a chain and the small gears, and is further transmitted to the hub member through the one-way clutch and the inner cylinder to cause the rear wheel to rotate. In addition, when the large gear is not rotated, e.g., while operating on a down-slope or the like, the inner cylinder is always cooperatively engaged with the rear wheel through the one-way clutch but merely rotates in an idling state. The outer cylinder and the small gears are not rotated, and the chain therefore does not run.

The present inventors have determined that there is a need in the background art to improve the running performance of the bicycle due to the fact that the chain does not run when the bicycle is operating in an inertia running state, e.g., where the bicycle is operated in a state in which the bicycle is not driven through rotation of the gear crank (corresponding to the crankshaft) in its normal rotating direction. In this state, positioning the chain among a plurality of small gears cannot perform power transmission.

Although the chain wound around the one large gear is positioned among a plurality of small gears arranged in a direction of the rotating central line for transmission, when the chain is applied between the large gear and the small gears placed at different positions in the rotating central line direction of the large gear (or small gears), it is sometimes found that the chain becomes offset with respect to a plane crossing at a right angle with the rotating central line. Accordingly, the chain can be removed from either the large gear or the small gears. Then, when a distance between the large gear and the small gears is relatively small, the inclination of the chain in respect to the crossing plane becomes excessively large, and the chain can be easily removed or dislodged from the gears.

In addition, when the bicycle is in an inertial operating state, a tension force of the chain is at a relative low value. Therefore, when the chain is inclined with respect to the crossing plane, the chain is in a such state in which it can be dislodged from either the large gear or the small gears more easily than compared with an operating state in which the crankshaft is being rotated in its normal rotational direction.

SUMMARY OF THE INVENTION

The present invention overcomes the shortcomings associated with the background art and achieves other advantages not realized by the background art.

An object of the present invention is to provide a transmission apparatus for a bicycle capable of performing a power transmission even under an inertial operating state of the bicycle, i.e., when the bicycle is moving due to inertia and not due to active pedaling by the rider.

An object of the present invention is to provide a one-way clutch in conjunction with the aforementioned transmission apparatus without showing any reduction in performance of the one-way clutch.

An object of the present invention is to provide an endless transmission belt that is prevented from being removed from either the driving rotating member or the driven rotating member during an inertial operating state.

One or more of these and other objects are accomplished by a transmission device for a bicycle and/or a bicycle comprising a crankshaft; an output shaft rotatably connected to a driving wheel of the bicycle; a driving, rotating member rotationally driven by the crankshaft; a multi-stage, driven, rotating member having a plurality of rotating elements drivingly connected to the output shaft, wherein the driven, rotating member is constantly engaged with and rotated with the output shaft; an endless transmission belt engaged with the driving, rotating member and the driven rotating member; a transmission change-over mechanism for repositioning the endless transmission belt among the plurality of rotating elements; and a one-way clutch for transmitting a rotation of the crankshaft in a normal rotating direction to the driving, rotating member, wherein the one-way clutch is arranged in a power transmission path extending from the crankshaft to the driving rotating member.

One or more of these and other objects are accomplished by a transmission device for a bicycle and/or a bicycle comprising a crankshaft operatively connected with at least one pedal; an output shaft rotatably connected to a driving wheel of the bicycle and positioned in parallel with the crankshaft; a driving sprocket rotationally driven by a chain engaged with the crankshaft; a multi-stage, driven sprocket having a plurality of rotating sprockets drivingly connected to the output shaft by a drive chain, wherein the driven sprocket is constantly engaged with and rotated with the output shaft and the driven chain is engaged with the driving, rotating member and the driven rotating member; a transmission change-over mechanism for repositioning the driven chain among the plurality of rotating sprockets; and a one-way clutch for transmitting a rotation of the crankshaft to the driving rotating member during a normal rotating direction, wherein the one-way clutch is arranged in a power transmission path extending from the crankshaft to the driving rotating member.

In accordance with the present invention, it is possible to perform a transmission operation by a transmission changing-over mechanism because both the driven rotating member rotated integrally with the output shaft is always cooperatively engaged with the driving wheel to rotate even during an inertial running state or in which the crankshaft is rotated in a reverse rotating direction. The driving rotating member wound around the driven rotating member and drivingly connected to the driven rotating member through the endless transmission belt is kept in a running state because the endless transmission belt is also in a running state.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE PREFERRED EMBODIMENTS

Figure 1:
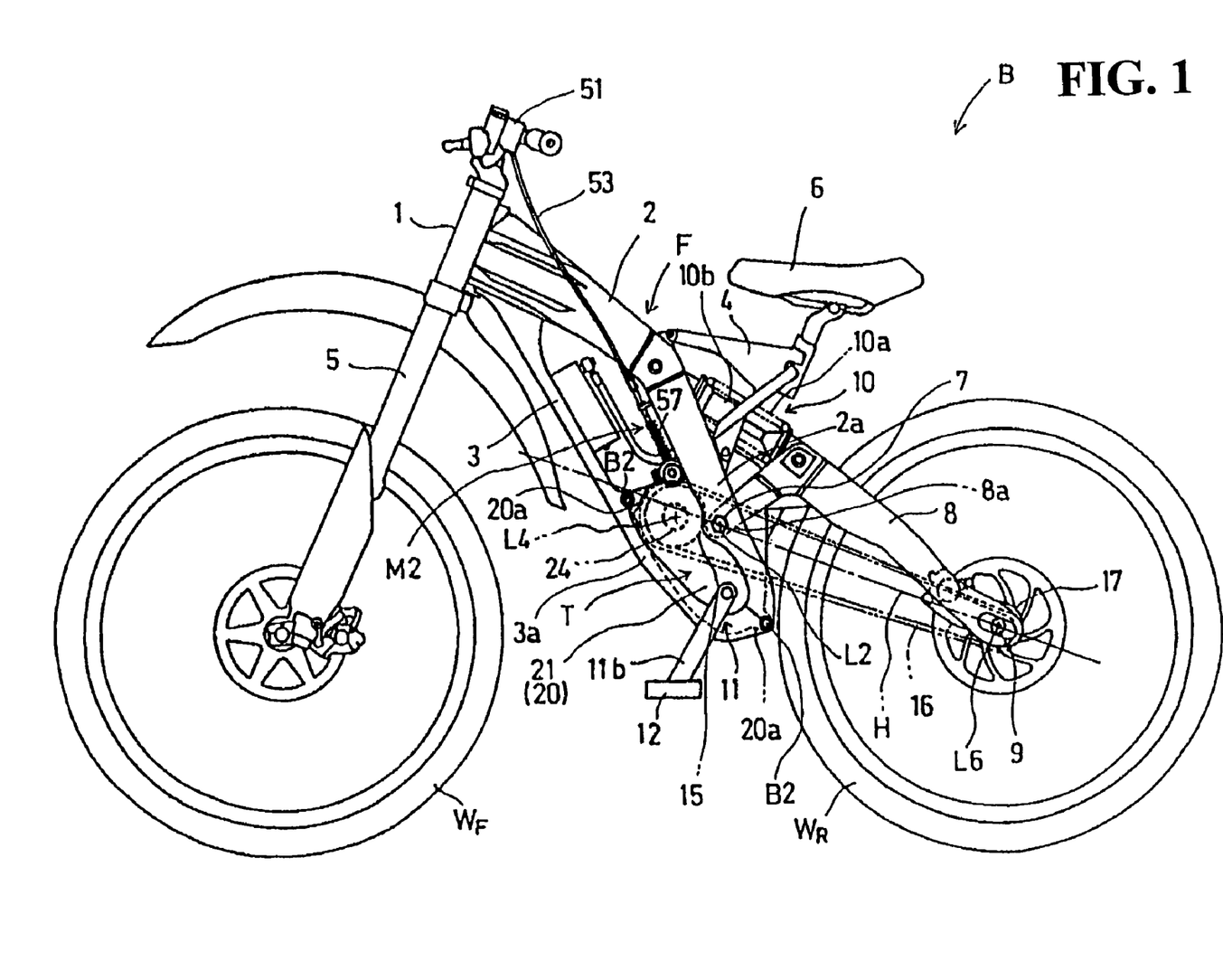
FIG. 1 is an elevational view of a left side of a bicycle according to an embodiment of the present invention.
Figure 2:
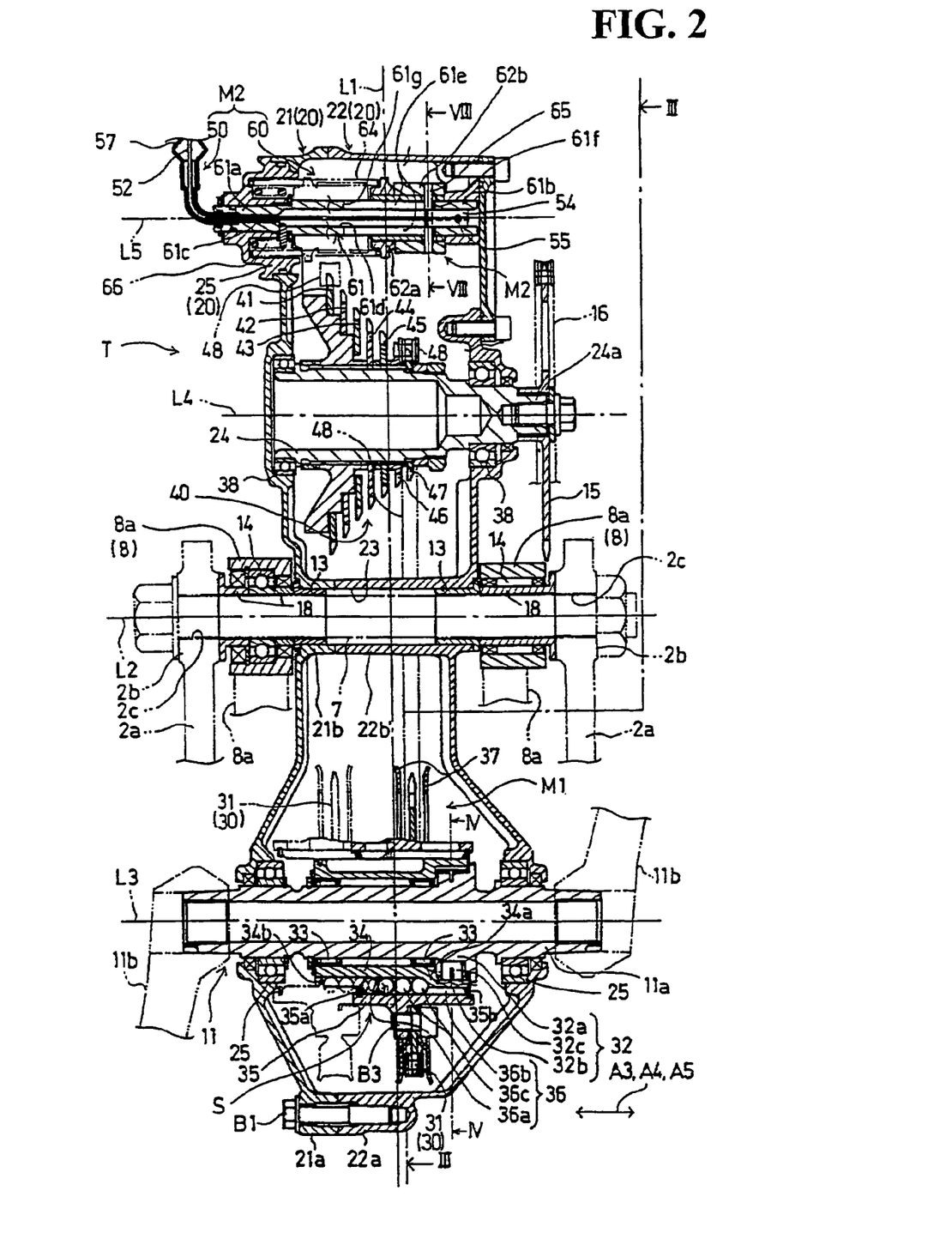
FIG. 2 is a sectional view taken along line II-II in FIG. 3.
Figure 3:
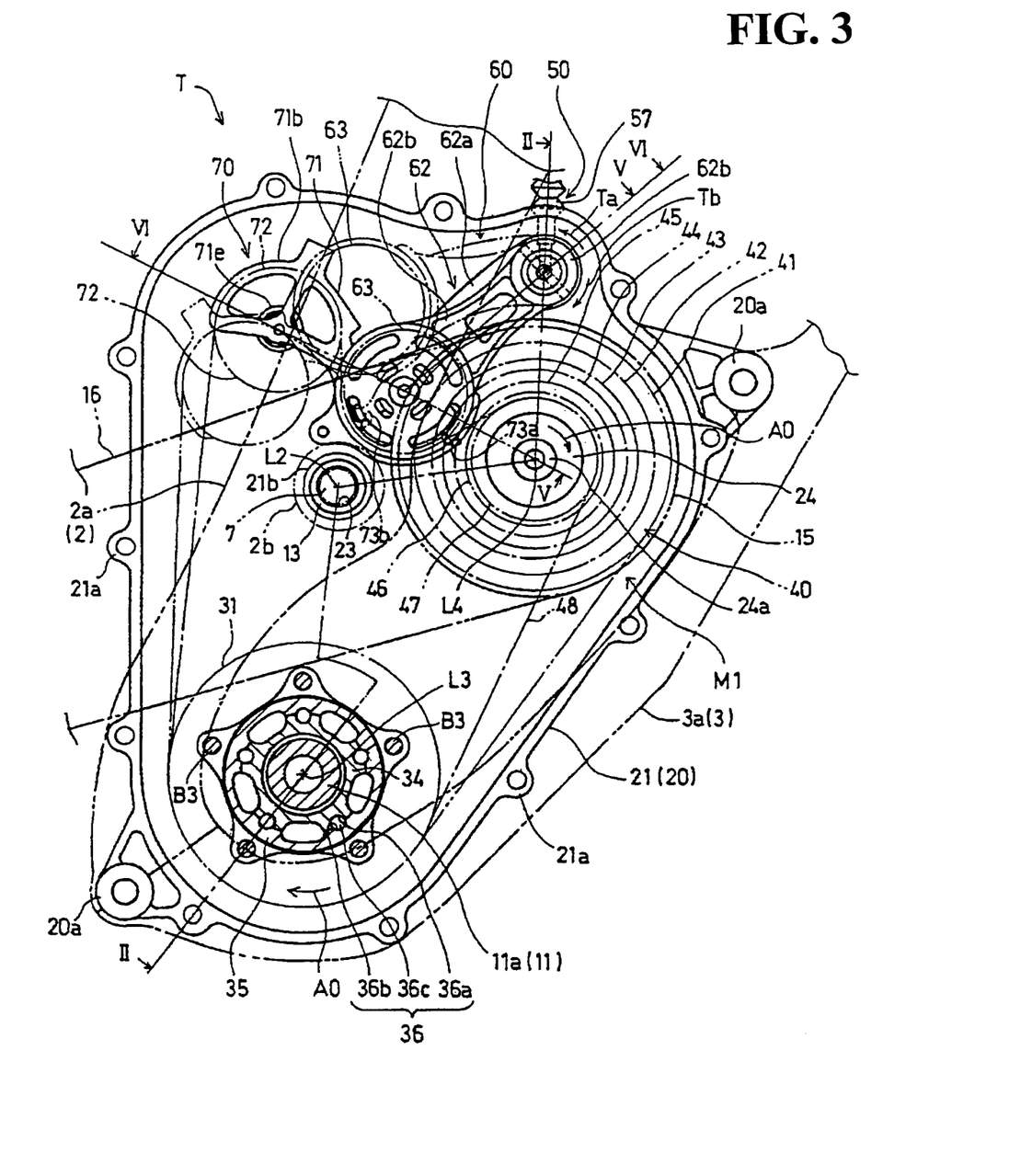
FIG. 3 is a sectional view taken along line III-III of FIG. 2 in a state in which a second case part of the transmission apparatus is removed.
Figure 4:
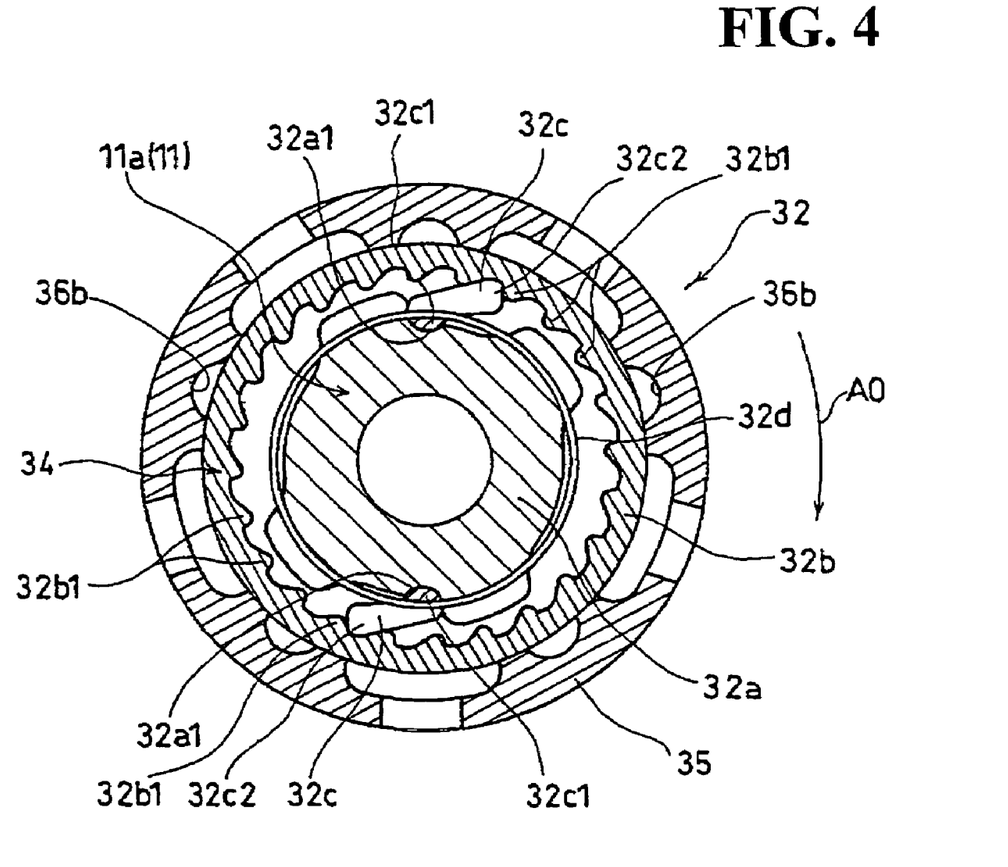
FIG. 4 is a sectional view taken along line IV-IV of FIG. 2.
Figure 5:
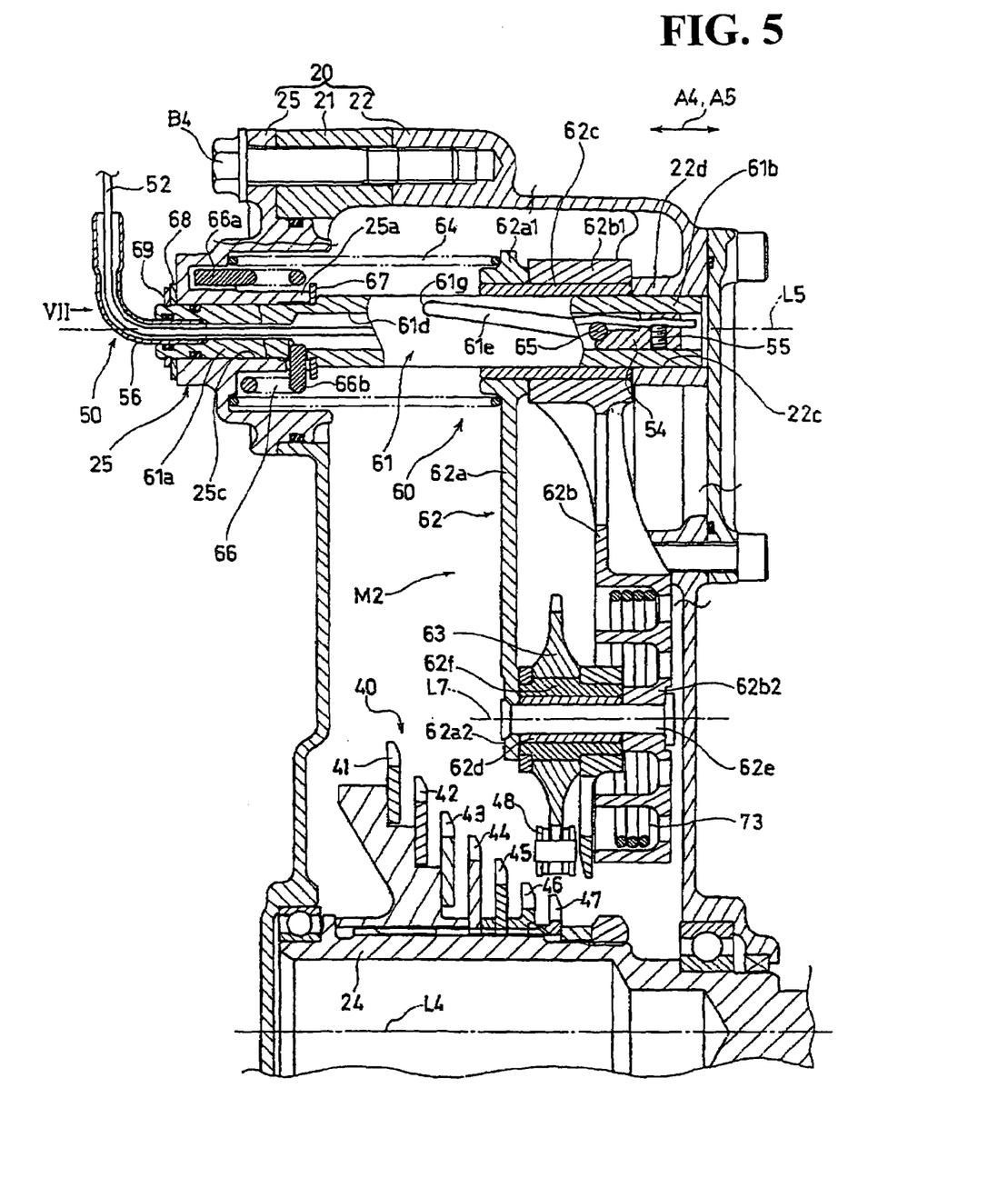
FIG. 5 is a sectional view taken along line V-V of FIG. 3.
Figure 6:
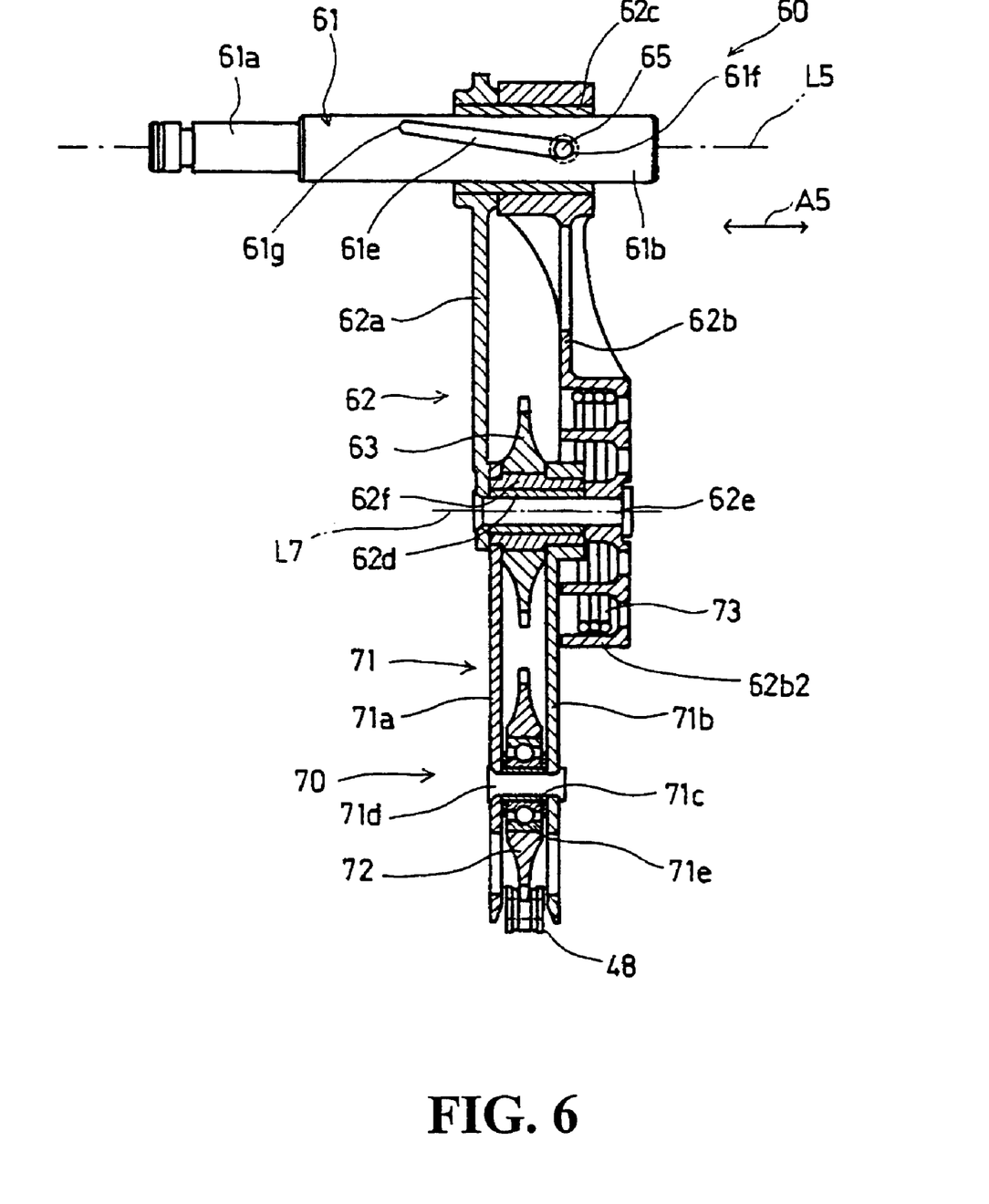
FIG. 6 is a sectional view taken along line VI-VI of FIG. 3 and showing a derailer and a tensioner.
Figure 7:
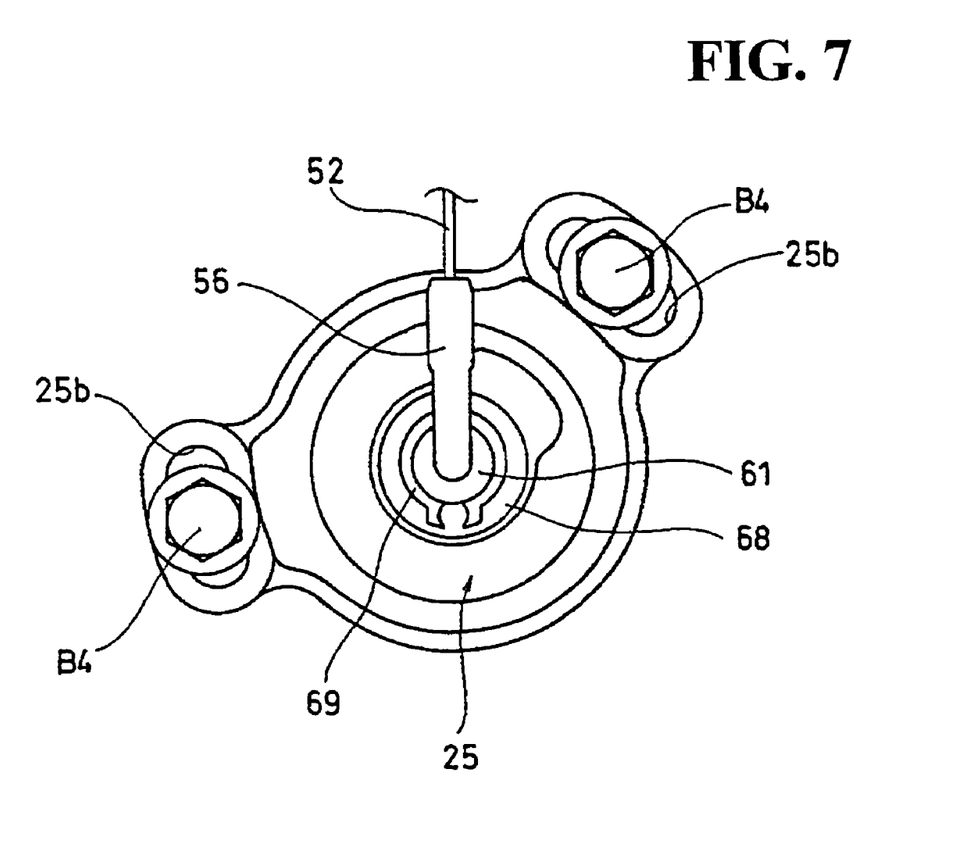
FIG. 7 is a side view as seen in the direction of arrow VII in FIG. 5.
Figure 8:
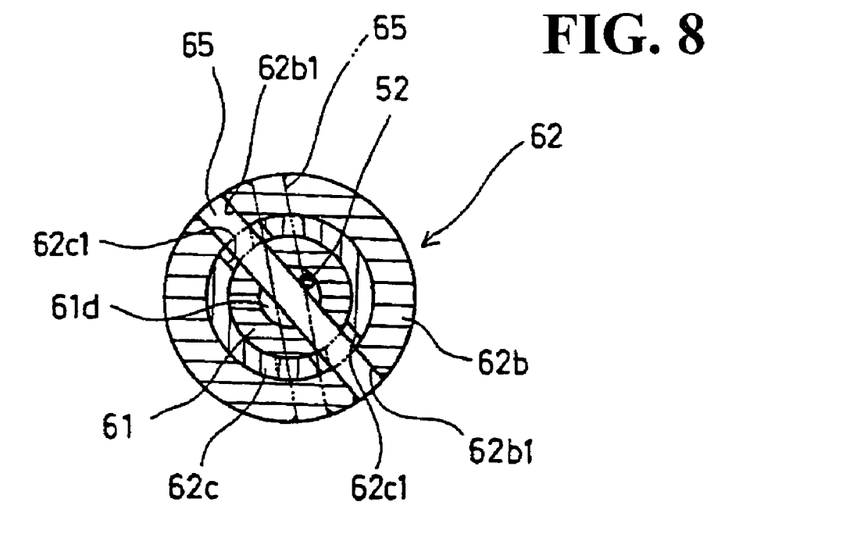
FIG. 8 is sectional view taken along VIII-VIII in FIG. 2.

The present invention will hereinafter be described with reference to the accompanying drawings. FIG. 1 is an elevational view of a left side of a bicycle according to an embodiment of the present invention. FIG. 2 is a sectional view taken along line II-II in FIG. 3. FIG. 3 is a sectional view taken along line III-III of FIG. 2 in a state in which a second case part of the transmission apparatus is removed. FIG. 4 is a sectional view taken along line IV-IV of FIG. 2. FIG. 5 is a sectional view taken along line V-V of FIG. 3. FIG. 6 is a sectional view taken along line VI-VI of FIG. 3 and showing a derailer and a tensioner. FIG. 7 is a side view as seen in the direction of arrow VII in FIG. 5. FIG. 8 is sectional view taken along VIII-VIII in FIG. 2.

A preferred embodiment of the present invention will be described in greater detail hereinafter with reference to FIGS. 1 to 8. Referring to FIGS. 1 and 2, a bicycle B in which the transmission apparatus of the present invention is used is shown. This bicycle is a mountain bike type of bicycle suitable for down-hill usage and/or use in competitions competing for time while descending a non-paved course, e.g., such as those courses having a high-speed corner or a jump section in a forest road and the like.

A body frame F of the bicycle B is comprised of a head pipe 1 for supporting a pair of right and left front forks 5 in a steering manner to pivotally support a front wheel WF at its lower end; a pair off right and left main frames 2 extending at an angle from the head pipe 1 in a rearward and downward direction; a down tube 3 extending from front ends of both main frames 2 at lower portions in a rearward and slant downward direction; and a saddle frame 4 extending from a central part of each of the main frames 2 to support a saddle 6.

Expressions such as "upper and lower," "forward and rearward," and "right and left" in the following written description are expressed with reference to the bicycle shown in FIG. 1, e.g., wherein the front wheel $W_F$ and the rear wheel $W_R$ of the bicycle are shown in a left side view.

Front ends 8a of a pair of right and left swing arms 8 support the rear wheel $W_R$ through a wheel shaft 9 fixed to the rear end of the bicycle. The right and left swing arms 8 are permitted to oscillate about a pivot shaft 7 acting as a pivot portion arranged at the rear parts 2a of both main frames 2. Both swing arms 8 are connected to both main frames 2 through a suspension 10 having both a compression spring 10a and a damper 10b. The swing arms 8 can also be oscillated in an upward and downward direction around the pivot shaft 7 together with the rear wheel WR.

The crankshaft 11 and the transmission apparatus including the transmission apparatus T and the driving power transmission mechanism are installed at the bicycle B. As shown in FIG. 1, between the rear parts 2a of both main frames 2 and the rear part 3a of the down tube 3 positioned in front of the rear parts 2a of the lower portion of the body frame F is arranged a transmission apparatus T fixed to the major shaft 11a of the crankshaft 11. These rear parts 2a, 3a, and said driving force transmission mechanism are arranged at a right side of one side with respect to a central body line L1 (refer to FIG. 2) of the central body line as seen from an upper and lower direction in a top plan view, a bicycle body width direction (coinciding with the right and left directions) and the transmission apparatus T.

Referring to FIG. 3 in addition to FIG. 1, the transmission apparatus T has a metallic case 20 made up of a pair of right and left, first and second case parts 21, 22 connected at several bolt fastening segments 21a, 22a formed at the peripheral edge with bolts B1 and a cap 25 to be described later. The case 20 is secured to the main frame 2 and the down tube 3 by bolts B2 acting as fasteners at a pair of fixing segments 20a formed at the peripheral edge part.

The crankshaft 11 acting as a pedal-type crankshaft has a major shaft 11a arranged to pass through the lower part of the case 20 in a right and left direction, and a pair of crank arms 11b connected to each of both right and left ends of the major shaft 11a projected outside the case 20. A pedal 12 (refer to FIG. 1) is rotatably arranged at each of the crank arms 11b for driving the crankshaft 11.

An output shaft 24, a derailer shaft 61 of the transmission apparatus T and the pivot shaft 7 above the major shaft 11a of the crankshaft 11 and above the case 20 are arranged to extend in a right and left direction in such a way that their rotating central line L4 and central axis lines L5, L2 may be in parallel to each other and each of the lines L4, L5 and L2 may be in parallel with the rotating central line L3 of the crankshaft 11. Accordingly, the crankshaft 11, output shaft 24, derailer shaft 61 and pivot shaft 7 occupy overlapped positions in the right and left direction and at the same time they are overlap with the central body line L1 as seen in a top plan view.

The pivot shaft 7 passes and extends inside a pair of cylindrical bushings 13 held at each of the passthrough holes 2c formed at the pivot hub 2b of the rear part 2a of each of the main frames 2 and the passthrough holes 23 formed at the cylindrical parts 21b, 22b of the first and second case parts 21, 22 and then the pivot shaft 7 is fixed to the rear part 2a of each of the main frames 2. Accordingly, each of the swing arms 8 is supported at the pivot shaft 7 and may be oscillated. The front end 8a positioned at the right and left sides of the case 20 and between the case 20 and the rear part 2a of each of the main frames 2 in a right and left direction is supported at the pivot shaft 7 projected outside the case 20 through a collar 18 and a bearing 14.

Referring to FIG. 1, the output shaft 24 and the pivot shaft 7 are arranged to be positioned within a rotating locus of the crank arm 11b. The output shaft 24 and the pivot shaft 7 are arranged with respect to the body frame F in such a way that the rotating central line L4 of the output shaft 24 is positioned in an imaginary oscillation range in an imaginary plane H; the imaginary plane H including an oscillation central line L2 for both swing arms 8 (coinciding with the central axis line L2 of the pivot shaft 7) and the rotating central line L6 of the rear wheel WR (coinciding with the central axis line of the wheel shaft 9). Although the imaginary plane H oscillates around the oscillation central line L2 within the imaginary oscillation range in correspondence with the oscillation range of both swing arms 8, the rotating central line L4 of the output shaft 24 is positioned in the imaginary oscillation range.

As seen in FIGS. 2 and 3, the output shaft 24 stored in the case 20 has a right end 24a acting as first end projecting outwardly from the second case 22, and then a driving sprocket 15 acting as an output driving rotating member is connected to the right end 24a. Referring to FIGS. 1-3, a chain 16 acting as a flexible output endless transmission belt is applied between the driving sprocket 15 and the driven sprocket 17 acting as the output driven rotating member drivingly connected to the rear wheel $W_R$. In this case, the driving sprocket 15, chain 16 and driven sprocket 17 form the driving power transmission mechanism for use in driving the rear wheel $W_R$, e.g., the driving wheel. The output shaft 24 is always cooperatively engaged with the rear wheel $W_R$ and is rotated in a normal rotating direction A0 (a rotating direction where the bicycle B is moved in a forward direction, and a normal rotating direction of various kinds of shaft and sprocket when the crankshaft 11 rotates in a normal rotating direction A0 is hereinafter denoted by symbol A0) and in an inverse rotating direction opposite to the normal rotating direction A0.

The present invention will be described in greater detail hereinafter with specific emphasis on the crankshaft 11 and the transmission apparatus T. As seen in FIGS. 2 and 3, the transmission apparatus T is provided with the case 20, a transmission mechanism M1 and a transmission changing-over mechanism M2 both of which are stored in the case 20. The crankshaft 11 is partially stored in the case 20 and is held by the case 20, and the transmission changing-over mechanism M2 is installed at the case 20 to change over the transmission mechanism M to a desired transmission position and is operatively connected to the transmission mechanism M1. In addition, the transmission mechanism M1 is provided with a one-way clutch 32, slide mechanism S, driving sprocket 30, driven sprocket member 40, chain 48 and output shaft 24 to be described later.

The crankshaft 11 acting as a first rotating shaft is rotatably supported at the case 20 through a pair of right and left bearings 25. Each of both bearings 25 arranged at portions near both ends of the major shaft 11a is held at both case parts 21, 22 within the case 20. A driving sprocket member 30 acting as the first rotating member or the driving rotating member is arranged at the major shaft 11a coaxially with the major shaft 11a between both bearings 25.

The driving sprocket 31 is drivingly connected to the major shaft 11a through the one-way clutch 32 arranged coaxially with the major shaft 11a and through the slide mechanism S, and the driving sprocket 31 is then rotationally driven by the crankshaft 11. As shown in FIG. 2, the driving sprocket 31 and the one-way clutch 32 are arranged at positions where they do not overlap each other in a direction A3 of the rotating central line L3 of the crankshaft 11.

As seen in FIGS. 1-4, the one-way clutch 32 is provided with a pair of ratchet claws 32c acting as clutch elements, a clutch inner 32a constituted by a part of the major shaft 11a, a clutch outer 32b constituted by a part of an inner cylinder 34 to be described later and a ring spring 32d held by the clutch inner 32a. Each of the ratchet claws 32c is supported at a base part 32c1 in a supporting part 32d1 composed of a notch formed at the outer circumferential surface of the clutch inner 32a and being capable of being oscillated, is biased by the ring spring 32d in such a way that its extremity end 32c2 may be engaged with many claws 32b1 formed at the inner circumferential surface of the clutch outer 32b.

When the clutch inner 32a is rotated relatively with respect to the clutch outer 32b in the normal rotating direction A0 of the crankshaft 11, the extremity end 32c2 of each of the clutch claws 32c is engaged with the claw 32b1. The clutch inner 32a and the clutch outer 32b are integrally rotated, and in turn when the clutch inner 32a is relatively rotated in an inverse rotating direction opposite to the normal rotating direction A0, the extremity end 32c2 of each of the clutch claws 32c is not engaged with the claw part 32b1 and the clutch inner 32a and the clutch outer 32b can be independently rotated with respect to each other. The one-way clutch 32 transmits only the rotation in the normal rotating direction A0 of the crankshaft 11 to the driving sprocket 31.

As seen in FIGS. 2 and 3, there is provided between the one-way clutch 32 and the driving sprocket 31 a slide mechanism S enabling the driving sprocket 31 to be moved toward the rotating central line direction A3 in respect to the major shaft 11a and at the same time integrally rotated with the clutch outer 32b of the one-way clutch 32. The slide mechanism S is provided with an inner cylinder 34 having a part constituting the clutch outer 32b and rotatably supported at the major shaft 11a in a coaxial relation with it through a pair of bearings 33 at an outer circumference of the major shaft 11a; an outer cylinder 35 arranged outside the inner cylinder 34 in a diameter direction and in coaxial with the inner cylinder; and a ball spline mechanism 36 acting as an engaging mechanism arranged between the outer circumferential surface of the inner cylinder 34 and the inner circumferential surface of the outer cylinder 35. The driving sprocket 31 and the chain guide 37 are connected to the outer cylinder 35 and integrally connected by bolts B3. The driving sprocket 31, chain guide 37 and outer cylinder 35 are rotated in an integral manner and moved integrally in a rotating central line direction along the major shaft 11a.

The ball spline mechanism 36 for integrally rotating the inner cylinder 34, driving sprocket 31 and outer cylinder 35, i.e. integrally rotating the slide mechanism S and the driving sprocket 31 and enabling the driving sprocket 31 and the outer cylinder 35 to be moved in the rotating central line direction A3 against the inner cylinder 34 and the major shaft 11 a includes a pair of storing grooves 36a, 36b of semi-circular sections each of which is formed to face against each other in a diameter direction at equal angular positions in a circumferential direction at the outer circumferential surface of the inner cylinder 34 and the inner circumferential surface of the outer cylinder 35. A row of balls 36c acting as engagement elements are rotatably stored in a pair of storing grooves 36a, 36b and are engaged with the inner cylinder 34 and the outer cylinder 35 in a circumferential direction. A plurality of sets of storing grooves 36a, 36b, e.g., five sets in this preferred embodiment, are arranged with a width of each of the storing grooves 36a, 36b in the rotating central line direction A3 being larger than a width of the row of balls at the rotating central line direction A3. The driving sprocket 31 can be translated in the rotating central line direction A3 within a moving range equal to the translation moving range of the changing-over moving range of the guide pulley 63 of the derailer 60 to be described later. The inner cylinder 34 and the outer cylinder 35 are provided with first stoppers 34a, 35a and second stoppers 34b, 35b for restricting motion of the row of balls in the rotating central line direction A3 so as to define the moving range of the driving sprocket 31 and the outer cylinder 35 and to prevent the balls 36c from being dropped.

The output shaft 24 acting as the second rotating shaft is rotatably supported at the case 20 through a pair of bearings 38 each of which is held at both case parts 21, 22 within the case 20. The case 20 is a member fixed to and arranged at the body frame F so as to support the crankshaft 11 and the output shaft 24 in a rotatable manner and support other members in the transmission mechanism M1 through these shafts 11 and 24, and to support the transmission change-over mechanism M2.

A multi-stage driven rotating member for transmission is drivingly connected to the output shaft 24, wherein the multi-stage driven rotating member acts as a secondary rotating member having a predetermined plurality of driving sprockets 31 acting as the rotating members of the driving sprocket 30. The driven rotating member is positioned at a position crossing with the central body line L1 as seen in a top plan view in such a way that the driven rotating member is always rotated integrally with the output shaft 24 between both bearings 38. The multi-stage driven rotating member in this preferred embodiment is a multi-stage driven sprocket member 40 having transmission sprockets 41 to 47 acting as the second rotating elements for different kinds of transmission and having the predetermined number, e.g., seven sprockets, of sprockets and different outer diameters (i.e. tip diameters).

Seven transmission sprockets 41 to 47 ranging from the fastest speed, 7-speed transmission sprocket 47 and having the minimum outer diameter to the slowest speed one-speed transmission sprocket 41 and having the maximum outer diameter are arranged side by side in a direction 44 of the rotating central line L4 also acting as the rotating central line of the driven sprocket member 40, spline connected at the outer circumferential surface coaxially with the output shaft 24, and drivingly connected to the output shaft 24.

A transmission chain 48 acting as a flexible transmission endless belt is applied over the driving sprocket member 30 and the driven sprocket member 40, and then a rotation is transmitted by the chain 48 between the crankshaft 11 and the output shaft 24. The transmission changing-over mechanism M2 is set such that a chain 48 is applied between the driving sprocket 31 and an operating sprocket acting as a certain transmission sprocket selected as one element from the transmission sprockets 41 to 47 by the transmission changing-over mechanism M2. The chain 48 is wound around the transmission sprocket 47 by positioning the chain 48 among the transmission sprockets 41 to 47, see FIG. 2.

The output shaft 24 is rotationally driven by the crankshaft 11 under a transmission ratio determined by the operating sprocket drivingly connected to the driving sprocket 31 through the chain 48. The power of the output shaft 24 is transmitted to the rear wheel $W_R$ through the driving sprocket 15, chain 16 and driven sprocket 17 (refer to FIG. 1).

Referring to FIGS. 3, 5 and 6, the transmission changing-over mechanism M2 operated by the transmission operating mechanism 50 includes a derailer 60 having a guide pulley 63, and a tension applying unit 70 having a tension pulley 72. The chain 48 is wound around the driving sprocket 31 and the sprocket, and the guide pulley 63 and the tension pulley 72 are arranged at a loosening side of the chain 48.

As seen in FIGS. 1, 3, 5 and 6, the transmission operating mechanism 50 is comprised of a transmission operating member 51. The transmission operating member 51 includes a transmission lever or the like operated by a driver, a wire 52 for operatively connecting the transmission operating member 51 with the derailer 60, and an outer tube 53 covering the wire 52. The portion near the case 20 of the wire 52 extending longer than the outer tube 53 is covered by a bellows 57 for prohibiting water and dust.

Referring to FIGS. 2, 3 and 5 to 7, the derailer 60 includes a derailer shaft 61 rotatably supported at the case 20; a derailer arm 62 having base ends 62a1, 62b1 slidably fitted to and supported at the derailer shaft 61 in such a way that they can be rotationally moved and translated in a direction of the central axis line; a guide pulley 63 acting as a guide rotating member rotatably supported at the extremity ends 62a2, 62b2 of the derailer arm 62; a pin 65 acting as an operating member for moving the derailer arm 62 in respect to the derailer shaft 61 in response to a transmission operation by the transmission operating mechanism 50; a balance spring 66 for providing a balance torque Tb balancing with a torque Ta acting from the derailer 62 to the derailer shaft 61 against the derailer shaft 61; and a return spring 64 for returning the derailer arm 62 to the first position to be described later.

The derailer shaft 61 is supported at the case 20 in such a way that its central axis line 5 is in parallel with the rotating central line 17 of the guide pulley 63 and the rotating central line L4 of the driven sprocket member 40. More practically, one end 61a of the derailer shaft 61 is fitted to a holding hole 25c of a cylinder 25a of the cap 25 connected to the fist case 21 by bolts B4 and supported at the first case 21 through the cap 25, and the other end 61b is fitted to a holding hole 22c of a second case 22 and supported at the second case 22.

A motion of the derailer shaft 61 in one direction (a leftward direction in FIGS. 2 and 5) at the central axis line direction A5 is restricted by an operation in which the washer 67 is fitted to the step part formed at an outer circumferential surface of the derailer shaft 61 and is abutted against the extremity end of the cylinder 25a having the holding hole 25c formed at the cap 25. The motion of the derailer shaft 61 in the other direction (a rightward direction in FIGS. 2 and 5) at the central axis line direction A5 is restricted under a state of allowing a rotation of the derailer shaft 61 by an operation in which a set ring 69 fitted to an annular groove formed at the outer circumferential surface is abutted against the washer 68 fitted to the outer circumferential surface of a portion projected from the cap 25 at one end 61a, respectively.

The other end 66b of the balance spring 66 includes a twisted coil spring having one end 66a engaged with the cap 25 and is engaged with one end 61a having a guide pipe 56 for use in guiding the wire 52 fixed to it and having an inserting hole 61c into which the wire 52 is inserted. The balancing torque Tb based on a spring force generated at the balancing spring 66 under a rotation of the derailer shaft 61 along with a rotation of the derailer arm 62 may act on the derailer shaft 61. Accordingly, a position of the derailer shaft 61 in its rotating direction is defined and the derailer arm 62 and the guide pulley 63 are rotated on the derailer shaft 61 in such a way that the chain 48 can be repositioned among the transmission sprockets 41 to 47 having different outer diameters in response to the transmission operation at the transmission operating mechanism M2.

The derailer shaft 61 is formed with a storing hole 61d for movably storing a column-like operating element 54 connected to the wire 52 by the set screw 55 fastening the wire 52 in a direction A5 of the central axis line L5; and a guide hole 61e acting as a guide part for use in guiding the pin 65 moved by the operating element 54 through engagement with the operating element 54. The storing hole 61d is a column-like hole with the central axis line L5 of the derailer shaft 61 being applied as a central axis line. The guide hole 61e is released to the storing hole 61d and is constituted by a pair of longitudinal holes positioned in opposition to the derailer shaft 61 in its diameter direction. Each of the longitudinal holes extends in the central axis line direction A5 and at the same time formed in a helical shape displaced in a circumferential direction.

The pin 65 is inserted into the guide hole 61e and engaged with the derailer shaft 61 (refer to FIGS. 2 and 6) to cause the derailer arm 62 and the guide pulley 63 to be rotated with respect to the derailer shaft 61 within a changing-over moving range. The pin 65 is guided by the guide hole 61e and moved in response to a transmission operation performed by the transmission operating mechanism M2 and at the same time to translated toward the central axis line direction AS of the derailer shaft 61.

The derailer arm 62 has a cylindrical hub 62c slidably fitted to an outer circumference of the derailer shaft 61 to be translated in a central axis line direction A5 and rotated; a pair of first and second arms 62a, 62b in which the base ends 62a1, 62b1 are press fitted to the outer circumference of the hub 62c; a rivet 62e acting as a connecting member inserted into a collar 62d arranged at the extreme ends of both arms 62a, 62b to define a clearance between both arms 62a, 62b; and a supporting shaft 62f rotatably supported at the outer circumference of the collar 62d fitted to the outer circumference of the rivet 62e and rotatably supporting the guide pulley 63 between the first and second arms 62a, 62b.

The guide pulley 63 having the chain 48 wound around it is rotated around the supporting shaft 62f with the central line in parallel with the rotating central line L4 of a driven sprocket 40 and the output shaft 24 being applied as a rotating central line L7. As seen in FIG. 8, the derailer arm 62 is driven by the pin 65 moved in response to the transmission operation based on the operation of the transmission operating member 51 (refer to FIG. 1). The pin 65 inserted into the guide hole 61e to translate in the central axis line direction A5 and rotate in a circumferential direction of the derailer shaft 61 is fixed to the derailer arm 62. Both ends of the pin 65 extending to pass through the guide hole 61e and a pair of through-holes 62c1 of the hub 62c are press fitted into a pair of passthrough holes 62b1 formed at the base end 62b1 of the second arm 62b. In addition, the extremity end of the second arm 62b is formed with a spring storing part 62b2 storing a tension spring 73 of a tensioner 70, and the tension spring 73 is arranged in the spring storing part 62b2 so as to enclose the rivet 62e.

As seen in FIG. 5, a return spring 64, including the compression coil spring, is arranged in the case 20 in such a way that its one end is abutted against a spring receiver of the cap 25, and the other end is abutted against the base end 62a1 of the first arm 62a. The return spring 64 biases the derailer arm 62 in such a way that the base end 62b1 of the second arm 62b is abutted against a stopper 22d formed at the second case 22 and is formed with a holding hole 22c when the derailer arm 62 occupies the first position of the maximum high speed transmission position where the chain 48 is wound around the transmission sprocket 47. At this time, the pin 65 is positioned at one end of the guide hole 61e and a slight clearance is formed between it and one edge 61f of the hole.

Referring to FIGS. 3 and 4, the tensioner 70 includes a holder 71 rotatably supported at the collar 62d of the derailer arm 62 between the first and second arms 62a, 62b; a tension pulley 72 acting as a tension rotating member rotatably supported at the holder 71; and a tension spring 73. The holder 71 includes a pair of first and second arms 71a, 71b press fitted and fixed to the outer circumference of the supporting shaft 62f at its base end; a collar 71c arranged at the extremity ends of both arms 71a, 71b to define a clearance between both arms 71a, 71b and acting as a supporting shaft of the tension pulley 72; a rivet 71d inserted into the collar 71c and acting as a connecting member holding the collar 71c to connect both arms 71a, 71b; and a bearing 71e fitted to the outer circumference of the collar 71c.

The tension pulley 72 is rotatably supported at the collar 71c between the first and second arms 71a, 71b through a bearing 71e. The chain 48 is wound around a guide pulley 63 and a tension pulley 72 while the first and second arms 71a, 71b are being applied as a chain guide. As shown in FIG. 3, the tension spring 73 includes a twisted coil spring engaged with the second arm 62b at one end 73a and engaged with the second arm 71b of the tensioner 70 at the other end 73b. The spring force of the tension spring 73 biases the holder 71 and subsequently the tension pulley 72, and applies a tension force of appropriate value to the chain 48 to prevent the chain 48 from being loosened.

Referring now to FIGS. 2, 3 and 5, a change-over movement range of the guide pulley 63 and a moving path of the guide pulley 63 within the change-over movement range for enabling a repositioning of the chain 48 guided by the guide pulley 63 to each of the transmission sprockets 41 to 47.

The change-over movement range of the guide pulley 63 under a transmission operation of the transmission operating mechanism 50 is defined by the first position where the derailer arm 62 is abutted against the stopper 22d by a spring force of the return spring 64 and the second position where the pin 65 is moved in one direction (a leftward direction as seen in FIGS. 2 and 5) and the derailer arm 62 is abutted against the washer 67 acting as a stopper so as to cause the position at the central axis line direction A5 to be set by a cylinder 25a of the cap 25.

A translation motion range of the motion range in the central axis line direction A5 in the change-over movement range is set in such a way that the guide pulley 63 can occupy the position at the same central axis line direction as that of the transmission sprocket 47 of minimum outer diameter and the transmission sprocket 41 of maximum outer diameter of the transmission sprockets positioned at both ends of the driven sprocket member 40 in the central axis line direction A4. In this case, it is determined in reference to the position of the stopper 22d at the first position and the position of the washer 67 in the central axis line direction A5 at the second position.

A rotating movement range of the movement range in a rotating direction in the change-over movement range is set in correspondence with the transmission sprocket 47 of the minimum outer diameter and the transmission sprocket 41 of the maximum outer diameter in such a way that the guide pulley 63 occupies the position spaced outwardly apart from these transmission sprockets 47, 41 by a predetermined distance, with respect to a direction of the respective diameter.

In this case, the derailer shaft 61 is rotatable with respect to the case 20. The derailer shaft is supported in a state in which motion in the central axis line direction A5 is substantially prohibited. Therefore, the rotating movement range is produced in reference to the shape of the guide hole 61e and a spring force of the tension spring 73 acting against the derailer arm 62. The rotating movement range is determined in reference to a balancing position of the derailer shaft 61 in the rotating direction where a torque Ta and a balancing torque Tb are balanced at the first position and the second position in dependence on the torque Ta acting on the derailer shaft 61 through the pin 65 and the balancing torque Tb acting on the derailer shaft 61 generated by a spring force of the balancing spring 66 so as to be balanced with the torque Ta.

Both orientations and values of these torques Ta, Tb are influenced by factors such as a spring constant of the tension spring 73, a spring constant of the balancing spring 66, an acting position of a spring force of each of the springs 73, 66 and a shape of each of the derailer shaft 61, derailer arm 62 and guide hole 61e. One example in which the rotating movement range and the motion path are set in reference to the spring forces of the tension spring 73 and the balancing spring 66.

As indicated by a solid line in FIGS. 2 and 3, the derailer arm 62 and the guide pulley 63 occupies the first position, and both torques Ta, Tb act upon the derailer shaft 61, i.e. the torque Ta generated by the spring force of the tension spring 73 having one end 73a engaged with the second arm 62b and the balancing torque Tb are kept in their balanced state. Adjustment of the balancing position so as to cause the guide pulley 63 to occupy the set first position is carried out by adjusting an initial load of the spring force of the balancing spring 66 at the first position. As shown in FIG. 7, the cap 25 is formed with a pair of insertion holes 25b including arcuate longitudinal holes into which each of the pair of bolts B4 is inserted. The initial load of the balancing spring 66 is adjusted by adjusting the position of the cap 25 in its circumferential direction along these insertion holes 25b.

In addition, as indicated by a chain double-dashed line in FIGS. 2 and 3, the torque Ta acting on the derailer shaft 61 and the balancing torque Tb are kept in a balanced state. The derailer arm 62 and the guide pulley 63 also occupy the second position. A spring constant of the balancing spring 66 is set in such a way that the guide pulley 63 may occupy the set second position. More practically, in the case that the derailer arm 62 occupies the second position where it is rotated in a clockwise direction against the first position as shown in FIG. 3 by the operating force acting on the pin 65 through the transmission operating mechanism 50, an angle held by the derailer arm 62 and a holder 71 of the tensioner 70 is increased to cause the spring force of the tension spring 73 to be increased. The torque Ta acting on the derailer shaft 61 is also increased. The balancing spring 66 may generate a spring force increasing in proportion to said predetermined angle because the derailer shaft 61 is rotated from a position in the rotating direction at said first position to a counter-clockwise direction only by a predetermined angle with the torque Ta increased as the derailer arm 62 is rotated. The spring constant of the balancing spring 66 is set in such a way that the increased balancing torque Tb and the increased torque Ta based on the spring force may be balanced at the balancing position where the guide pulley 63 occupies the second position.

A rotating angle of the guide pulley 63 attained from the first position at the balancing position at the second position becomes a small angle which is smaller by the predetermined angle, e.g., 10°, than a rotating angle, e.g., 40°, determined in reference to a shape of the guide hole 61e under an assumption in which the derailer shaft 61 is not rotated. Setting of the spring forces for a tension spring 73 and a balancing spring 66 as described above causes the guide pulley 63 to be moved on the motion path within the change-over movement range except the first position and the second position in such a way that it may occupy the same position in the central axis line direction A5 in respect to each of the transmission sprockets 42 to 46 at each of the transmission positions when the derailer shaft 61 occupies the balancing position and it may occupy the position spaced apart by a predetermined distance in an outward diameter direction.

When the transmission operating member 51 is operated and the operating element 54 connected to the wire 52 is moved to one direction (a leftward direction in FIGS. 2 and 5) of the central axis line direction A5 so as to direct toward one end 61a in the storing hole 61d for carrying out a repositioning of the chain toward the low speed side, the derailer arm 62 is translated in the central axis line direction A5 against the spring force of the return spring 64 on the derailer shaft 61 rotated against the spring force of the balancing spring 66 within the change-over movement range together with the pin 65 guided by the guide hole 61e with the operating force acting through the moving operation element 54 and concurrently it is rotated around the derailer shaft 61.

The chain 48 guided by the guide pulley 63 moved together with the derailer arm 62 occupying the transmission position determined by an operating amount of the transmission operating member 51 is wound around the operating sprocket alternatively selected from a group of transmission sprockets 41 to 47 in response to the transmission position, and the driving sprocket 31 and the operating sprocket are drivingly connected by the chain 48.

The action and effects of the preferred embodiment will be described in greater detail hereinafter. As shown in FIGS. 2 and 3, the crankshaft 11 rotated in a normal rotating direction A0 by a driver operating the pedals 12 under a state in which the transmission sprocket 47 is selected as the operating sprocket from a group of transmission sprockets 41 to 47 by the derailer 60 having the derailer arm 62 placed at the first position, i.e. a state in which the seven-speed position is selected as the transmission position rotationally drives the driving sprocket 31 through the one-way clutch 32 and the slide mechanism S. Due to this fact, the one-way clutch 32 and the slide mechanism S are arranged in a power transmitting path ranging from the crankshaft 11 to the driving sprocket 31.

The driving sprocket 31 rotationally drives the transmission sprocket 47, output shaft 24 and driving sprocket 15 through the chain 48 under a transmission rate determined by both sprockets 31, 47. The driving sprocket 15 rotationally drives the driven sprocket 17 (refer to FIG. 1) and the rear wheel $W_R$ through the chain 16. The power of the crankshaft 11 rotationally driven by the driver is transmitted to the output shaft 24 through the driving sprocket 31, chain 48 and transmission sprocket 47, the power of the output shaft 24 is transmitted to the rear wheel WR through the driving force transmission mechanism and the bicycle B runs at the seven-speed position.

When the transmission operating member 51 is operated to select the transmission sprocket 41, e.g., from the slower-speed transmission sprockets 41 to 46 as the operating sprocket so as to change-over the transmission position by the derailer 60, the operating element 54 moved in a leftward direction in the central axis line direction A5 as seen in FIG. 2 by the wire 52 pushes the pin 65 to cause the pin 65 guided by the guide hole 61e to be moved toward the other edge 61g of the guide hole 61e. At this time, the derailer arm 62 moved integrally with the pin 65 and the guide pulley 63 are translated in a leftward direction as seen in FIG. 2 on the derailer shaft 61 in the central axis line direction A5 and at the same time they are rotated around the derailer shaft 61 in a clockwise direction as seen in FIG. 3. When the derailer arm 62 is abutted against the washer 67, they may occupy the first-speed position (this first-speed position is also the second position) which is a transmission position indicated by the chain double-dotted line in FIGS. 2 and 3. The state of the pin 61p at this time is indicated in FIG. 5 by the chain double-dotted line.

The chain 48 is moved in a leftward direction as seen in FIG. 2 together with the guide pulley 63 and is repositioned from the transmission sprocket 47 to the transmission sprocket 41 and is drivingly connected to the driving sprocket 31 through the chain 48. At this time, the driving sprocket 31 movable by the slide mechanism S in the rotating central line direction A is moved on the major shaft 11a in the rotating central line direction A3 by a partial force of the tension of the chain 48 in the rotating central line direction A3 and occupies the position indicated by the chain double-dotted line in FIG. 2. In addition, the tension pulley 72 occupies the position for applying a tension of suitable value to the chain 48 by the tension spring 73.

When the transmission operating member 51 is operated to cause the wire 52 to be loosened in such a way that the operating sprocket is selected from the faster speed transmission sprockets 42 to 47 than the transmission sprocket 41, the return spring 64 causes the derailer arm 62 to move toward the first position, the guide pulley 63 selects the fast-speed transmission sprockets 42 to 47 as the operating sprocket and then the chain 48 is repositioned to the operating sprocket. At this time, the chain 48 causes the driving sprocket 31 to move up to the position corresponding to a new transmission position in the rotating central line direction A3 in concurrent with motion of the derailer arm 62, and then the bicycle B runs in a transmission rate at a new transmission position.

In the case that the transmission position is changed over in a similar manner, the derailer arm 62, guide pulley 63 and tension pulley 72 are moved toward the desired transmission position in response to an operation of the transmission operating member 51 and concurrently the driving sprocket 31 is moved on the major shaft 11a in the rotating central line direction by a partial force of the tension of the chain 48 in the rotating central line direction A3. The one operating sprocket corresponding to a desired transmission position is selected from a group of sprockets 41 to 47 by the derailer 60, and the driving sprocket 31 and the operating sprocket are drivingly connected through the chain 48.

The chain 48 is applied over the driving sprocket 31 and the driving sprocket of the driven sprocket 40 along the plane crossing at a right angle with the rotating central line 13 of the crankshaft 11 (this right angle crossing plane in FIG. 2 is in parallel with the central body line L1), i.e. in parallel with the right angle crossing plane because the driving sprocket 31 is moved in the same direction as that of the translation of the derailer arm 62 in the change-over movement range while being followed to the motion of the derailer arm 62 for changing-over the transmission position.

In the case of the transmission apparatus T in which the chain 48 is applied over the driving sprocket 30 drivingly connected to the crankshaft 11 and the driven sprocket drivingly connected to the output shaft 24 and arranged in parallel with the crankshaft 11, the driving sprocket 31 of the driving sprocket member 30 is movably supported at the crankshaft 11 in the rotating central line direction A3 in such a way that the chain 48 is applied to the driving sprocket 31 of the driving sprocket member 30 along the right angle crossing plane crossed at a right angle with the rotating central line L3 and each of the transmission sprockets 41 to 47 of the driven sprocket member 40, i.e. the operating sprocket. Therefore, even in the case that the chain 48 is wound around any one of the transmission sprockets 41 to 47, the driving sprocket member 30 is moved in the rotating central line direction in such a way that the chain 48 is applied over the driving sprocket member 30 and the driven sprocket member 40 along the right angle crossing plane in respect to the rotating central line L3, so that the chain 48 is prevented from being inclined in respect to the right angle crossing plane, and the chain 48 is prevented from being removed from the driving sprocket 31 or the transmission sprockets 41 to 47 without having any relation to an inter-axis distance between the crankshaft 11 and the output shaft 24 (this inter-axis distance corresponds to a distance between the rotating central line L3 and the rotating central line L4), and even when the inter-axis distance is short. Further, the chain 48 is prevented from being removed from either the driving sprocket 31 or the transmission sprockets 41 to 47 during an inertia running state of the bicycle and when the driver stops operating the pedals 12 in a forward direction.

Further, the driving sprocket member 30 includes one driving sprocket 31, the driving sprocket member 30 can be moved in the rotating central line direction A3 by the slide mechanism S arranged between the crankshaft 11 and the driving sprocket member 30 and at the same time the driving sprocket member is drivingly connected to the crankshaft 11, thereby the motion range of the driving sprocket member 30 in the rotating central line direction A3 is made minimum and the size of the transmission apparatus T is made small in the rotating central line direction.

In the case of the one-way clutch 32 arranged at the power transmission path and the slide mechanism S, the slide mechanism S is arranged between the one-way clutch 32 and the driving sprocket member 30, thereby as compared with the case in which an intermediate member, for example, the one-way clutch is present between the slide mechanism S and the driving sprocket member 30, the inertia when the driving sprocket member 30 is moved in the rotating central line direction A3 becomes low. The motion of the driving sprocket member 30 is faster during transmission and the chain is prevented from being removed.

In the case of the transmission apparatus T in which the chain 48 is applied to the driving sprocket member 30 and the multi-stage driven sprocket member 40 constituted by a plurality of transmission sprockets 41 to 47 is repositioned by the transmission changing-over mechanism M2 among the plurality of transmission sprockets 41 to 47, the driven sprocket member 40 drivingly connected to the output shaft 24 always cooperated with the rear wheel WR and rotated is arranged to be always rotated in an integral manner. The one-way clutch 32 for transmitting a rotation of the crankshaft 11 in the normal rotating direction A0 to the driving sprocket member 30 is arranged in the power transmitting path ranging from the crankshaft 11 to the driving sprocket member 30. Therefore, even under an inertial operating state, the driven sprocket member 40 and driving sprocket member 30 are integrally rotated with the output shaft 24 and is always cooperated with the rear wheel WR and rotated. The transmission can be carried out through the transmission changing-over mechanism M2, resulting in that the transmission can always be carried out as desired if the bicycle B is in a running state and a running performance of the bicycle B is improved.

The driving sprocket member 30 and the one-way clutch 32 are arranged coaxially with the crankshaft 11 and at a position where they do not overlap in the rotating central line direction A3 of the crankshaft 11. The driving sprocket member 30 and the one-way clutch 32 are arranged coaxially with the crankshaft 11 and are not restricted in view of a size in the diameter direction by the crankshaft 11 and the driving sprocket member 30. A clutch performance, e.g., such as a clutch capacitance or the like, can be easily assured and they can be arranged without producing any reduction in performance of the one-way clutch 32. In addition, a desired rigidity of the crankshaft 11 is obtained because a shaft diameter of the shaft part 11a of the crankshaft 11 is no longer required to be small.

The derailer shaft 61 for supporting in a rotatable and translatable manner in the central axis line direction A5 the derailer arm 62 is supported at the case 20 in such a way that its central axis line L5 is in parallel with the rotating central line L7 of the guide pulley 63 and the rotating central line L4 of the driven sprocket member 40. Therefore, the derailer arm 62 is rotated around the central axis line L4 in parallel with the driven sprocket member 40 and the rotating central line L7 of the guide pulley 63, and it is not necessary to arrange any specific member for keeping a parallel relationship with the rotating central line L7 of the guide pulley 63 and the rotating central line L4 of the driven sprocket member 40, except the derailer shaft 61 supporting the derailer arm 62. As a result, the structure of the derailer 60 is simplified and the number of component parts is reduced, and subsequently the cost is reduced.

The derailer shaft 61 is rotatably supported at the case 20. The derailer 60 is provided with the balancing spring 66 for generating a balancing torque Tb acting on the derailer shaft 61 in response to the spring force generated through rotation of the derailer shaft 61 accompanied by a rotation of the derailer arm 62 with the pin 65 moved while being guided by the guide hole 61e in response to the transmitting operation of the transmission operating mechanism 50, so as to cause it to be balanced with the torque Ta acting on the derailer shaft 61 from the derailer arm 62 through the pin 65. When the chain 48 is repositioned among the plurality of transmission sprockets 41 to 47, the derailer arm 62 is rotated and translated against the derailer shaft 61 through the pin 65 and at the same time the derailer shaft 61 is rotated by the torque Ta acting on the derailer shaft 61 from the derailer arm 62 through the pin 65. However, the balancing torque Tb generated by the spring force of the balancing spring 66 produced in response to the rotation is still balanced with the torque Ta and the guide pulley 63 occupies the predetermined new position. At this time, the derailer shaft 61 is not fixed to the case 20, but its rotation is merely restricted by the balancing spring 66. Therefore, an excessive outer force exceeding an external force acted on the derailer arm 62, e.g., an excessive tension generated when the chain 48 is engaged with the driven sprocket member 40 during a transmitting operation while the bicycle B is being moved rearwardly under a state in which the driver rides off the bicycle and the chain is rotated together with the driven sprocket member 40 while being locked causes the excessive torque to be generated in the derailer arm 62. When the excessive torque acts on the pin 61e and the derailer shaft 61, the derailer shaft 61 deforms the balancing spring 66 and rotates, resulting in that the excessive torque is loosened and the excessive torque acted on the derailer arm 62, pin 65 and derailer shaft 61 is reduced. These members are prevented from being deformed with the excessive force, and the derailer 60 and the transmission apparatus T show an improved durability.

The output shaft 24 can be easily changed in its arrangement with the transmission apparatus T, and a degree of freedom in its arrangement may also be increased in order to adapt for changes in position of the body frame F or pivot shaft 7. The chain 48 is used for drivingly connecting the sprocket drivingly connected to the output shaft 24 having the chain 16 drivingly connected and the driving sprocket 31.

A modified configuration in regard to the preferred embodiment includes the following. The case 20 of the transmission apparatus T may be made of synthetic resin. Further, the transmission apparatus T is not provided with the case 20 and in this case, the crankshaft 11, output shaft 24 and derailer 60 are fixed to the body frame F or supported at the body frame F through a supporting member, e.g., such as a bracket and the like integrally formed with the body frame F.

A belt may be used as the endless transmission belt for a transmission operation and further pulleys are used as the driving rotating member and the driven rotating member. In addition, it may also be applicable that the endless belt is used as an output endless belt for the rear wheel WR and pulleys are used as the output driving rotating member and the output driven rotating member.

In the preferred embodiment, although the driving sprocket 30 includes the driving sprocket 31 acting as one rotary element, it may also be applicable that the driving sprocket includes a plurality of driving sprockets arranged in the rotating central line direction A3 and having different tip diameters.

It is also applicable that the engaging mechanism arranged at the slide mechanism S is a spline constituted by several protrusions formed at the outer circumferential surface of the inner cylinder 34 and the inner circumferential surface of the outer cylinder 35 and several grooves to which these protrusions are fitted. In the case that the driving sprocket member is separate from the crankshaft 11 and coaxially arranged at the intermediate rotating shaft rotationally driven by the crankshaft 11 through the transmission mechanism, the one-way clutch 32 is arranged in the power transmission path ranging from the crankshaft 11 to the driving sprocket member, e.g., between the intermediate rotating shaft and the driving sprocket member.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A transmission device for a bicycle comprising:
a crankshaft;
an output shaft rotatably connected to a driving wheel of the bicycle;
a driving rotating member rotationally driven by the crankshaft;
a multi-stage driven rotating member having a plurality of rotating elements drivingly connected to the output shaft, wherein said driven rotating member is constantly engaged with and rotated with said output shaft;
an endless transmission belt engaged with said driving rotating member and said driven rotating member; a transmission change-over mechanism for repositioning said endless transmission belt among said plurality of rotating elements; and
a one-way clutch for transmitting a rotation of said crankshaft in a normal rotating direction to said driving rotating member, wherein said one-way clutch is arranged in a power transmission path extending from said crankshaft to said driving rotating member, wherein said driving rotating member and said one-way clutch are arranged coaxially with said crankshaft and at positions where they do not overlap each other in a direction (A3) of a rotating central line (L3) of the crankshaft.

2. The transmission device according to claim 1, further comprising a slide mechanism in said power transmission path enabling said driving rotating member to be moved in a direction of a rotating central axis of said crankshaft so that the slide mechanism is rotated integrally with said driving rotating member.

3. The transmission device according to claim 2, wherein said endless transmission belt is engaged with said driving rotating member and said driven rotating member in a position parallel with a plane crossing at a right angle with the rotating central axis of said crankshaft.

4. The transmission device according to claim 1, wherein said endless transmission belt is engaged with said driving rotating member and said driven rotating member in a position parallel with a plane crossing at a right angle with the rotating central axis of said crankshaft.

5. The transmission device according to claim 1, wherein the one-way clutch is provided with a pair of ratchet claws, a clutch inner formed by a part of the crankshaft, a clutch outer formed by an inner cylinder and a ring spring held by the clutch inner.

6. A bicycle comprising the transmission according to claim 1.

7. A transmission device for a bicycle comprising:
a crankshaft operatively connected with at least one pedal;
an output shaft rotatably connected to a driving wheel of the bicycle and positioned in parallel with said crankshaft;
a driving rotating rotating sprocket rotationally driven by a chain engaged with said crankshaft;
a multi-stage driven sprocket having a plurality of rotating sprockets drivingly connected to the output shaft by a drive chain, wherein said driven sprocket is constantly engaged with and rotated with said output shaft and said driven chain is engaged with said driving rotating sprocket and said driven rotating sprocket;
a transmission change-over mechanism for repositioning said driven chain among said plurality of rotating sprockets; and
a one-way clutch for transmitting a rotation of said crankshaft to said driving rotating sprocket during a normal rotating direction, wherein said one-way clutch is arranged in a power transmission path extending from said crankshaft to said driving rotating sprocket, wherein said driving rotating sprocket and said one-way clutch are arranged coaxially with said crankshaft and at positions where they do not overlap each other in a direction (A3) of a rotating central line (L3) of the crankshaft.

8. The transmission device according to claim 7, further comprising: a slide mechanism in said power transmission path enabling said driving rotating sprocket to be moved in a direction of a rotating central axis of said crankshaft so that the slide mechanism is rotated integrally with said driving rotating sprocket.

9. The transmission device according to claim 8, wherein said drive chain is engaged with said driving rotating sprocket and said driven rotating sprocket in a position parallel with a plane crossing at a right angle with the rotating central axis of said crankshaft.

10. The transmission device according to claim 7, wherein said drive chain is engaged with said driving rotating sprocket and said driven rotating sprocket in a position parallel with a plane crossing at a right angle with the rotating central axis of said crankshaft.

11. The transmission device according to claim 7, wherein the one-way clutch is provided with a pair of ratchet claws, a clutch inner formed by a part of the crankshaft, a clutch outer formed by an inner cylinder and a ring spring held by the clutch inner.

12. The transmission device according to claim 11, wherein the slide mechanism includes the inner cylinder having a portion forming the clutch outer and rotatably supported coaxially at the crankshaft through a pair of bearings; an outer cylinder arranged exterior to the inner cylinder and coaxially with the inner cylinder; and a ball spline mechanism between an outer circumferential surface of the inner cylinder and an inner circumferential surface of the outer cylinder.

13. The transmission device according to claim 12, further comprising a chain guide connected with the driving rotating sprocket to the outer cylinder and integrally connected by bolts.

14. The transmission device according to claim 13, wherein the driving rotating sprocket, chain guide and outer cylinder are integrally rotated and are capable of being moved integrally in a direction of the rotating central axis of the crankshaft.

15. A bicycle comprising the transmission according to claim 14.

16. A transmission device for a bicycle comprising:
a crankshaft operatively connected with at least one pedal;
an output shaft rotatably connected to a driving wheel of the bicycle and positioned in parallel with said crankshaft;
a driving sprocket rotationally driven by a chain engaged with said crankshaft;
a multi-stage, driven sprocket having a plurality of rotating sprockets drivingly connected to the output shaft by a drive chain, wherein said driven sprocket is constantly engaged with and rotated with said output shaft and said driven chain is engaged with said driving sprocket and said driven sprocket;

a transmission change-over mechanism for repositioning said driven chain among said plurality of rotating sprockets; and a one-way clutch for transmitting a rotation of said crankshaft to said driving sprocket during a normal rotating direction, wherein said one-way clutch is arranged in a power transmission path extending from said crankshaft to said driving sprocket, wherein the one-way clutch is provided with a pair of ratchet claws, a clutch inner formed by a part of the crankshaft, a clutch outer formed by an inner cylinder and a ring spring held by the clutch inner, and wherein the slide mechanism includes the inner cylinder having a portion forming the clutch outer and rotatably supported coaxially at the crankshaft through a pair of bearings; an outer cylinder arranged exterior to the inner cylinder and coaxially with the inner cylinder; and a ball spline mechanism between an outer circumferential surface of the inner cylinder and an inner circumferential surface of the outer cylinder.

\* \* \* \* \*